(12) United States Patent
Dost et al.

(10) Patent No.: US 7,871,224 B2
(45) Date of Patent: Jan. 18, 2011

(54) DRILL BIT AND REAMER

(75) Inventors: Hagen W. Dost, Chicago, IL (US); Patrick M. McAuliffe, Chicago, IL (US); Javier Ibarra, Schaumburg, IL (US); Alexander D. Socha, Altamonte Springs, FL (US)

(73) Assignee: Robert Bosch GmbH, Stuttgart, DE (US)

( * ) Notice: Subject to any disclaimer, the term of this patent is extended or adjusted under 35 U.S.C. 154(b) by 536 days.

(21) Appl. No.: 11/904,175

(22) Filed: Sep. 26, 2007

(65) Prior Publication Data

US 2009/0080989 A1 Mar. 26, 2009

(51) Int. Cl.
*B23B 51/02* (2006.01)

(52) U.S. Cl. .................. 408/211; 408/225; 408/230

(58) Field of Classification Search .......... 408/211, 408/223–225, 227, 230; *B23B 51/00, 51/02*
See application file for complete search history.

(56) References Cited

U.S. PATENT DOCUMENTS

| | | | |
|---|---|---|---|
| 2,859,645 A | 11/1958 | Emmons et al. | |
| 3,147,646 A | 9/1964 | Rawcliffe, Jr. | |
| 3,667,857 A | 6/1972 | Shaner et al. | |
| 3,863,316 A | 2/1975 | Yeo | |
| 3,945,753 A | 3/1976 | Byers et al. | |
| 3,977,807 A * | 8/1976 | Siddall | 408/223 |
| 4,090,807 A | 5/1978 | Stewart | |
| 4,507,028 A | 3/1985 | Matsushita | |
| 4,753,558 A | 6/1988 | Jansson | |
| 4,789,276 A | 12/1988 | Clarke | |
| 4,810,136 A | 3/1989 | Paige | |
| 4,936,721 A | 6/1990 | Meyer | |
| 4,944,640 A * | 7/1990 | Suzuki et al. | 408/211 |
| 4,957,397 A | 9/1990 | Huff | |
| 4,968,193 A | 11/1990 | Chaconas et al. | |
| 5,071,294 A * | 12/1991 | Suzuki et al. | 408/145 |
| 5,112,167 A * | 5/1992 | Shiga et al. | 408/211 |
| 5,282,705 A | 2/1994 | Shiga et al. | |
| 5,288,183 A | 2/1994 | Chaconas et al. | |

(Continued)

FOREIGN PATENT DOCUMENTS

DE 10 2004 026 014 5/2004

(Continued)

OTHER PUBLICATIONS

PCT international search report in a corresponding PCT application (i.e. PCT/US2008/077719) dated Nov. 24, 2009 (2 pages).

*Primary Examiner*—Daniel W Howell
(74) *Attorney, Agent, or Firm*—Maginot, Moore & Beck (57) ABSTRACT

A tool bit providing a combined drill bit and reamer is disclosed herein. The tool bit comprises an axial bit shaft including a bore end and a shank end. At least one helical land portion is provided on the bit shaft. The at least one helical land portion includes a cutting edge and a trailing edge. At least one reamer blade is provided on the helical land portion at the bore end of the bit shaft. The at least one reamer blade includes a substantially axial cutting edge. A tip arrangement is also included on the bore end of the bit shaft. The tip arrangement includes a center blade positioned between peripheral cutting blades.

16 Claims, 5 Drawing Sheets

U.S. PATENT DOCUMENTS

| | | | | |
|---|---|---|---|---|
| 5,312,208 A | * | 5/1994 | Shiga et al. | 408/224 |
| 5,486,075 A | * | 1/1996 | Nakamura et al. | 408/230 |
| 5,636,948 A | | 6/1997 | Rexius | |
| 5,980,169 A | | 11/1999 | Hinch | |
| 6,443,674 B1 | | 9/2002 | Jaconi | |
| 6,857,832 B2 | * | 2/2005 | Nygård | 408/211 |

FOREIGN PATENT DOCUMENTS

| | | | | |
|---|---|---|---|---|
| EP | 137898 A1 | * | 4/1984 |
| GB | 1419624 A | * | 12/1975 |
| JP | 63093520 A | * | 4/1988 |
| JP | 04343608 A | * | 11/1992 |
| JP | 05245711 A | * | 9/1993 |
| JP | 05293708 A | * | 11/1993 |
| JP | 07040117 A | * | 2/1995 |
| JP | 08155715 A | * | 6/1996 |
| JP | 2001341018 A | * | 12/2001 |
| JP | 2002200511 A | * | 7/2002 |
| SU | 1161273 A | * | 6/1985 |
| SU | 1191197 A | * | 11/1985 |

* cited by examiner

DRILL BIT AND REAMER

FIELD

This invention relates to the field of drill bits, and more particularly combination drill bits and reamers.

BACKGROUND

Drill bits are widely used for drilling holes in various materials, including wood, wood laminates, plastic countertop material, metals, and other natural or artificial materials. Drill holes are created along the axis of the drill bit.

In addition to the ability to drill holes, some drill bits also include additional features. For example, some drill bits are ground to a high precision to provide a reaming function. Other drill bits include cutting features that allow the bit to cut in a lateral direction (i.e., a direction perpendicular to the axis of the drill bit).

Although drill bits with reaming ability in metal have been provided in the past, these combined drill and reamer bits have included certain disadvantages in wood and laminated materials. For example, past drill and reamer bits have included a tip that is difficult to stabilize and keep on line when the initial drill hole is started. As another example, past drill and/or reamer bits have had problems producing clean cuts that result in splintering or tear out on entrance and/or exit of the bit from a drill hole.

Accordingly, it would be desirable to provide a combined drill and reamer bit including features that stabilize the bit and keep it on line when the initial drill hole is started, allowing the bit to produce precise drill holes. It would also be advantageous to provide a combined drill and reamer bit that produces clean cuts that do not result in splintering or tear-out upon entrance and/or exit of the bit from a drill hole. While it would be desirable to provide a tool bit that provides one or more of the above or other advantageous features as may be apparent to those reviewing this disclosure, the teachings disclosed herein extend to those embodiments which fall within the scope of the appended claims, regardless of whether they accomplish one or more of the above-mentioned advantages.

SUMMARY

A tool bit providing a combined drill bit and reamer is disclosed herein. The tool bit comprises an axial bit shaft including a bore end and a shank end. At least one helical land portion is provided on the bit shaft along with at least one helical flute. The at least one helical land portion includes a leading edge and a trailing edge. At least one reamer blade is provided on the bore end of the bit shaft. The reamer blade includes a substantially axial cutting edge. A tip arrangement is also included on the bore end of the bit shaft. The tip arrangement includes a center blade. The center blade is positioned between two spurs on the boring end of the bit shaft.

In at least one embodiment, the at least one reamer blade comprises a first reamer blade and a second reamer blade provided on the bore end of the bit shaft. In particular, the first substantially axial cutting edge provides an end edge of the helical land portion at the bore end of the bit shaft. The at least one reamer cutting edge further comprises a second substantially axial cutting edge provided at the bore end of the bit shaft. In at least one embodiment, the substantially axial cutting edge on the reamer blade includes a smaller diameter portion and a greater diameter portion with a ramp portion positioned in between.

The above described features and advantages, as well as others, will become more readily apparent to those of ordinary skill in the art by reference to the following detailed description and accompanying drawings.

DESCRIPTION

Figure 1:
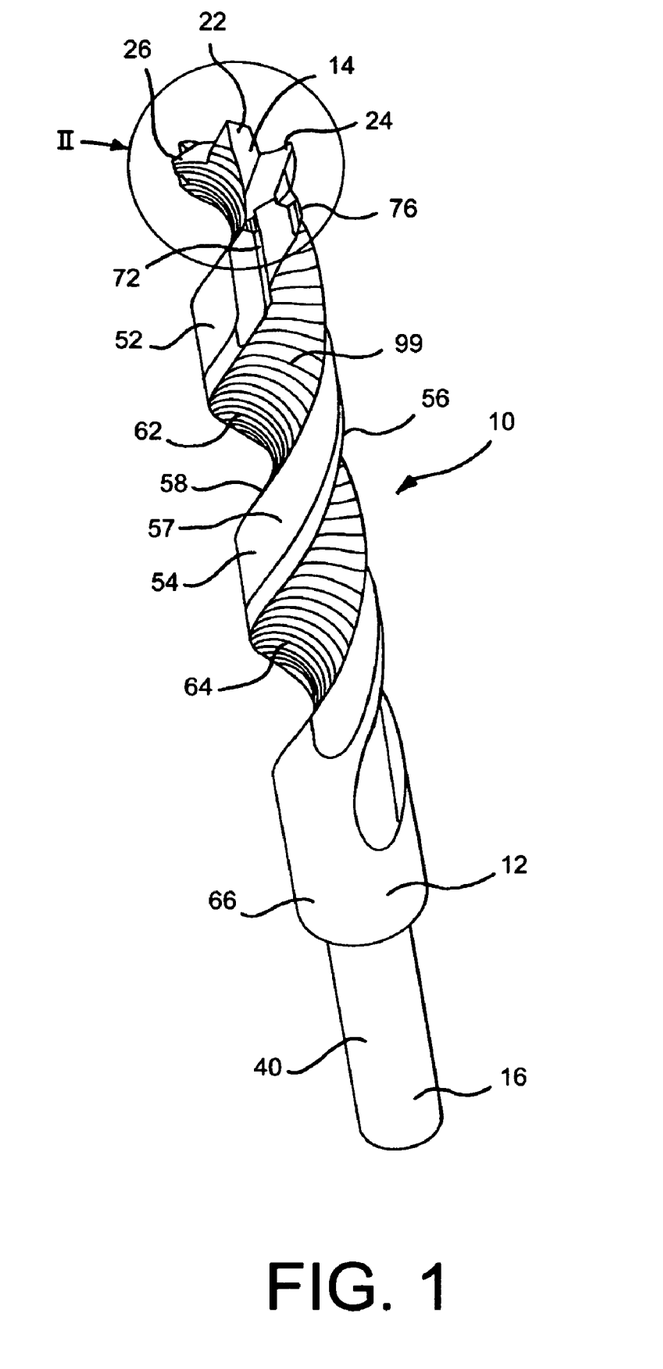
FIG. 1 shows a perspective view of one embodiment of a tool bit that provides a combined tool bit and reamer arrangement.
Figure 3:
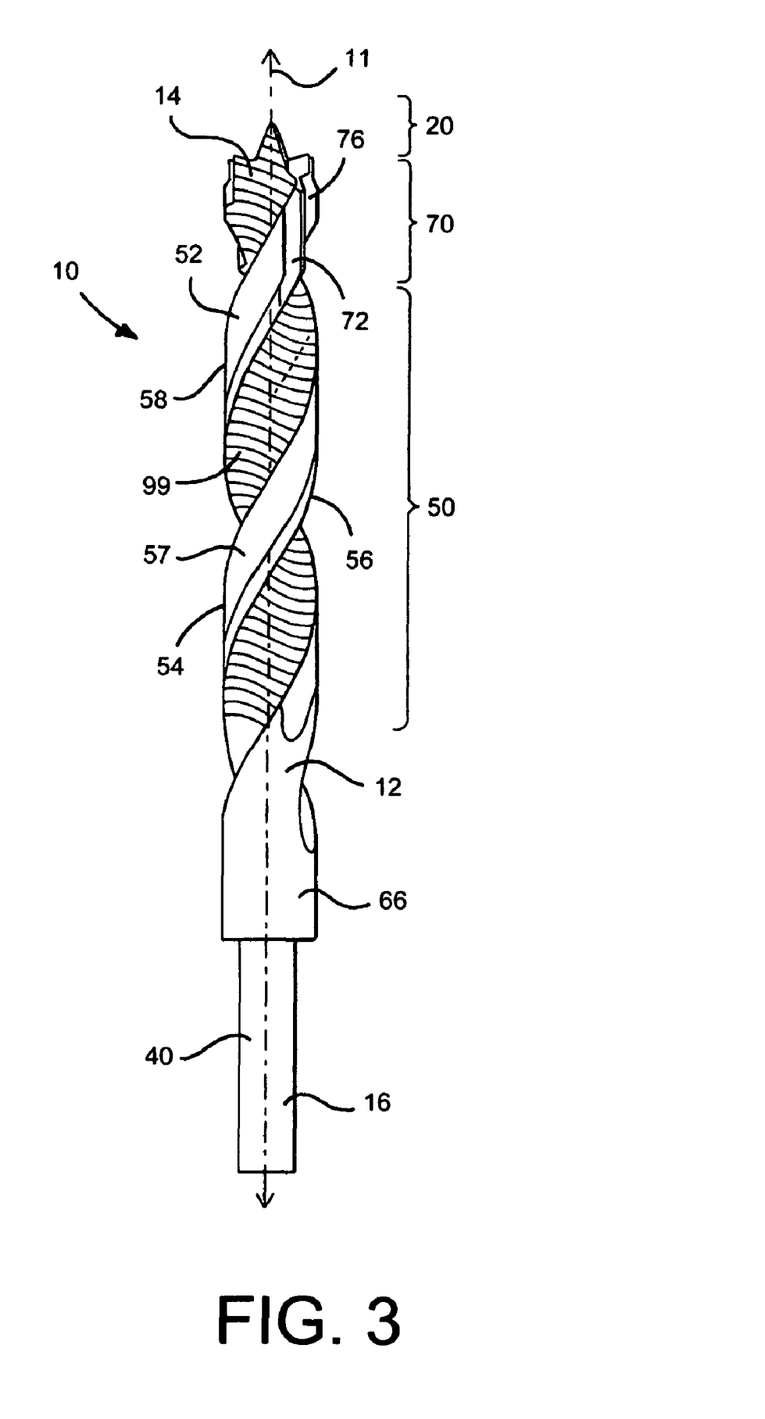
FIG. 3 shows a side view of the tool bit of FIG. 1.

With reference to FIG. 1, one embodiment of a tool bit 10 is shown in the form of a combined drill bit and reamer. The tool bit 10 comprises an axial shaft 12 with two ends 14 and 16. One end 14 of the drill bit 10 is a boring end 14 and the opposite end is a shank end 16. The shank end 16 is configured to engage a power hand drill or other drilling apparatus. The tool bit 10 includes a plurality of different portions which include different features. In particular, as shown in FIG. 3, the tool bit 10 includes a tip portion 20, a flute portion 50, and a reamer portion 70 positioned between the tip portion 20 and the drill portion 50.

Figure 2:
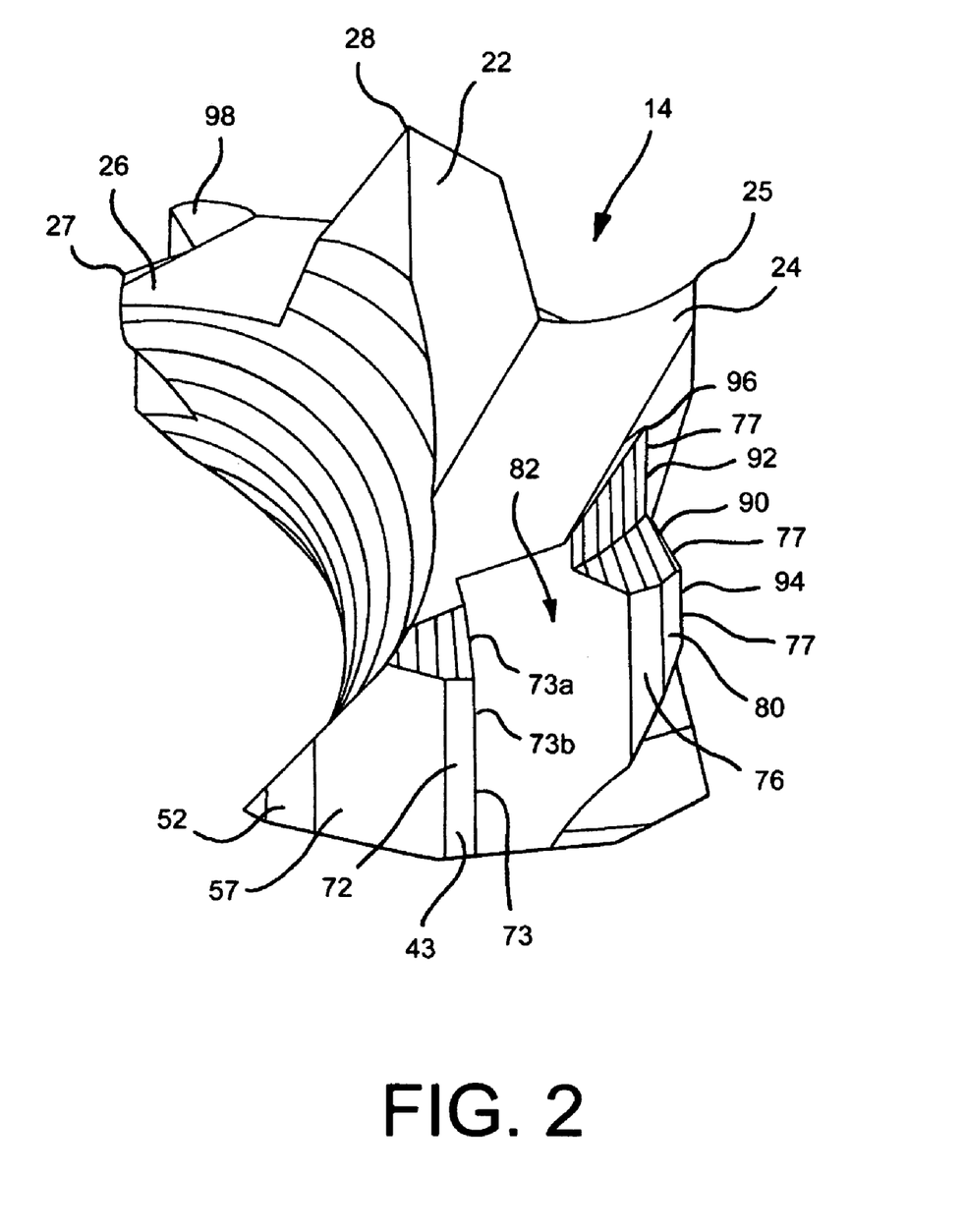
FIG. 2 shows an enlarged perspective view of a boring end of the tool bit of FIG. 1.

With particular reference to FIGS. 1 and 2, the tip portion 20 is provided on the boring end 14 of the tool bit 10. The tip portion 20 includes a tip arrangement comprising a central blade 22 and two peripheral lips in the form of chip lifters 24, 26. Spurs 96, 98 project from the sides of the chip lifters 24, 26. The central blade 22 is shown in the form of a pyramidal structure that includes several polygonal faces meeting at an end tip 28. The central blade 22 may also be provided in other structural forms, including a rounded conical form, a generally flat form, or a polyhedron form. In any event, the central blade 22 has a diameter that is substantially smaller than the overall diameter of the tool bit. The central blade 22 provides a drilling structure that begins the drilling process. In particular, the small central blade initially drills a small hole that is used to stabilize the bit 10 during drilling before the larger diameter of the tool bit 10 drills into and expands the diameter of the hole. The central blade 22 provides a brad point arrangement on the boring end 14 of the tool bit 10. However, it will be recognized that other tip arrangements are possible other than the brad point arrangement of the disclosed embodiment.

The central blade 22 is centrally positioned on the tip arrangement between the two peripheral cutting lips 24, 26. The peripheral cutting lips 24, 26 are provided to the outside of the central blade 22, with each cutting lip including an end tip 25, 27. Along with the tip 28 of the central blade 22, the end tips 25, 27 of the peripheral cutting lips 24, 26, and the spurs 96, 98 provide the farthest tips on the boring end 14 of the tool bit from the shank end 16 of the tool bit 10. The central blade 22 is used to create an initial stabilizing or locating hole for the tool bit. Next, the spurs 96, 98 cut into the drilling material, and prepare chips of material to be lifted by the cutting lips 24, 26. Thereafter, the cutting lips 24, 26 remove chips of material from the drilling hole, passing chips on to flutes 62, 64 on the tool bit 10.

As best seen in FIG. 1, the flute portion 50 of the tool bit 10 includes at least two lands 52, 54 winding upon the shaft 12 of the bit 10 in a helical fashion. Helical flutes 62, 64 are formed between the lands 52, 54. Lines 99 are included in FIGS. 1-4 for the purposes of visualizing the helical nature of these flutes 62, 64; however, the surfaces of the flutes 62, 64 are smooth and lines 99 do not indicate additional structural components in the flutes 62, 64.

Each land portion 52, 54 includes a leading edge 56 and a trailing edge 58 with a primary helical surface portion 57 in between. The primary helical surface portion 57 of each land portion is relatively smooth. The distance from the center axis 11 to the primary helical surface portion 57 in a direction that is perpendicular to the axis 11 of the shaft 12, defines the primary radius dimension (and thus the diameter dimension) for the tool bit 10.

The surface of the land portion 52 at the leading edge 56 forms an acute angle with respect to the concave surface of the adjacent flute 62. The surface of the land portion 52 may also be chamfered between the leading edge 56 and the primary helical surface 57. At the trailing edge 58 of the land portion 52, the surface of the land portion 52 forms an obtuse angle with respect to the adjacent concave flute 64. The flutes 62, 64 provided between the leading edges 56 and trailing edges 58 of the land portions 52, 54 act to channel chips of material cut by the tool bit 10 down the axis 11 and away from the boring end 14 of the shaft 12.

The land portions 52, 54 extend most of the distance from the boring end 14 of the shaft to the shank end 16 of the shaft. Near the shank end 16 of the shaft 12, the land portions 52, 54 terminate and the flutes 62, 64 taper into a cylindrical section 66. A shank portion 40 is provided adjacent to the cylindrical section 66 at the shank end 16 of the shaft. The shank portion 40 includes features that allow the shank to be retained by a tool, such as a power drill. For example, the shank portion 40 may include one or more flat faces that facilitate securing the shank portion in a tool chuck. Opposite the shank end 16, at the boring end 14 of the shaft 12, the land portions 52, 54 extend to reamer blades 72, 74. The chip lifters 24, 26 are arranged as interrupted extensions of the land portions 52, 54, with reamer blades 72, 74 positioned in between.

The reamer portion 70 of the tool bit 10 is provided between the flute portion 50 and the tip portion 20. The reamer portion 70 includes a plurality of reamer cutting edges, which are also referred to herein as reamer blades, including leading reamer blades 76, 78, and trailing reamer blades 72, 74. Leading reamer blade 76 is arranged as an interrupted extension of land portion 52 and trailing reamer blade 72 is positioned on an end portion of one land portion 52. Another leading reamer blade 78 and trailing reamer blade 74 are positioned on an end portion of the other land portion 54.

With reference to FIG. 2, each reamer blade 72, 76 includes a cutting edge 73, 77 that extends substantially parallel to the axial shaft 12 (i.e., substantially parallel to axis 11). The trailing reamer blade 72 is formed on the land portion 52 closer to the shank end than the leading reamer blade 76. The leading reamer blade 76 is formed on the land portion 52 closer to the boring end 14 than the trailing reamer blade 72. A concave groove 82 is positioned between the trailing reamer blade 72 and the leading reamer blade 76.

With continued reference to FIG. 2, the leading reamer blade 76 is positioned along the helical land portion 52 between the peripheral chip lifter 24 of the tip arrangement and the trailing reamer blade 72. The concave groove 82 separates the leading reamer blade 76 from the trailing reamer blade 72. The leading reamer blade 76 includes a stepped cutting edge 77 that is defined by a smaller diameter portion 92 and a greater diameter portion 94. The smaller diameter portion 92 is actually provided along the edge of the spur 96 which extends from the chip lifter 24. Accordingly, the edge of the spur 96 also provides a cutting edge for leading reamer blade 76. Both the smaller diameter portion 92 and the greater diameter portion 94 of the leading reamer blade 76 are oriented in a substantially axial direction.

Figure 6:
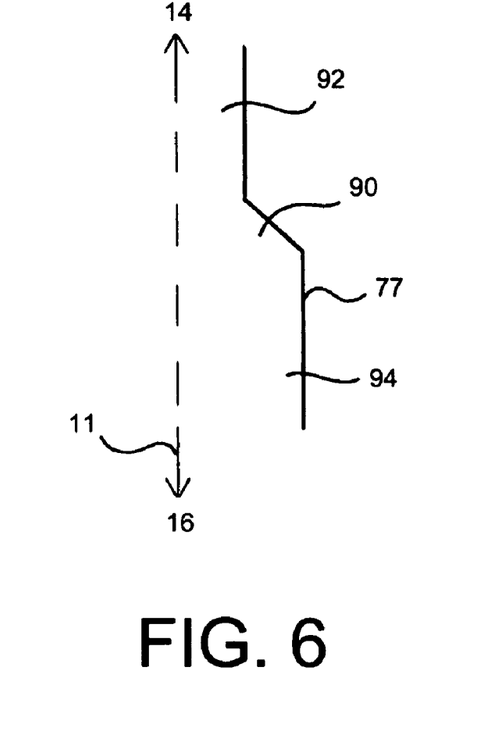
FIG. 6 shows a profile of the bit diameter of the tool bit of FIG. 1 moving along the cutting edge of the reamer.
Figure 7:
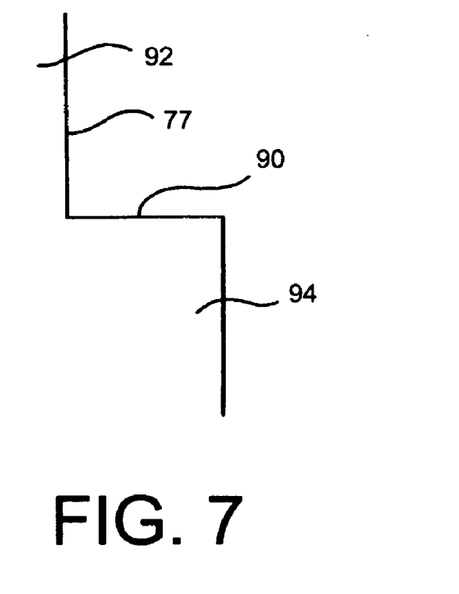
FIG. 7 shows an alternative embodiment of the profile of FIG. 6.
Figure 8:
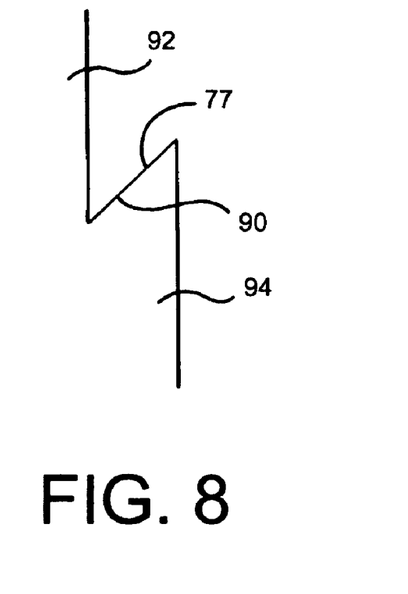
FIG. 8 shows another alternative embodiment of the profile of FIG. 6.

The leading reamer blade 76 includes a ramp portion 90 positioned between the smaller diameter portion 92 and the greater diameter portion 94. The diameter of the cutting edge 77 gradually increases along the ramp portion 90 moving from the smaller diameter portion 92 near the boring end 14 toward the larger diameter portion 94 closer to the shank end 16. The smaller diameter portion 92 has a diameter that more closely matches the diameter of the bit 10 at the spur 96, while the larger diameter portion 94 has a diameter that more closely matches the diameter of the bit 10 at the flute portion 50. As shown in FIG. 6, the ramp portion 90 provides for a diameter transition in the tool bit 10 such that the diameter gradually tapers outward moving from the boring end 14 of the shaft 12 towards the shank end 16. However, it will be recognized that other diameter transitions are possible. For example, as shown in the embodiment of FIG. 7, the ramp portion 90 could also be provided as a perpendicular ledge or step. As another example, as shown in FIG. 8, the ramp portion 90 could also be provided as a diameter that tapers outward moving from the shank end 16 toward the boring end 14.

Figure 5:
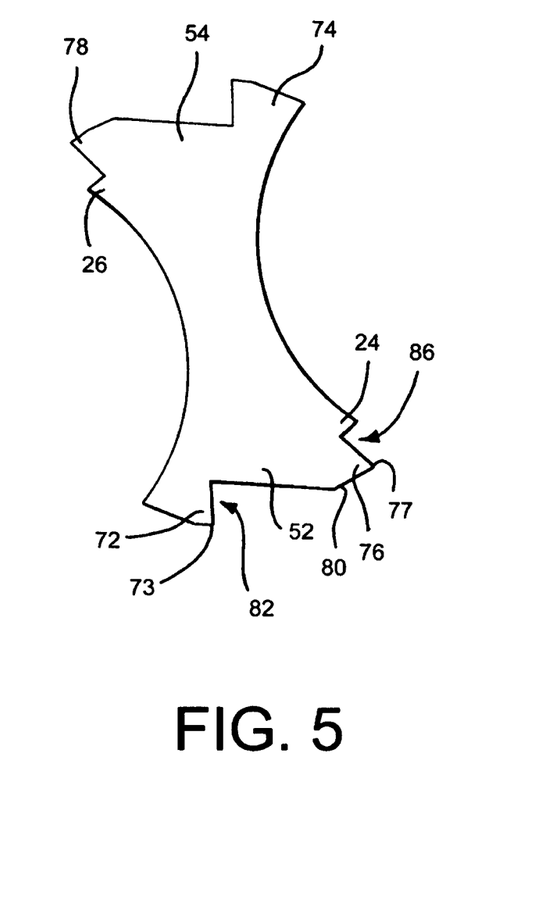
FIG. 5 shows a cross-sectional view of the tool bit of FIG. 4 along line IV-IV.

The trailing reamer blade 72 is provided on the primary helical surface portion 57 of the land portion 52. A chamfered edge 43 is provided between the cutting edge 73 of the trailing reamer blade 72 and the primary helical surface portion 57 on the outer surface of the of the reamer blade 72. As best seen in FIG. 5, an acute angle is formed at the cutting edge 73 where the outer surface of the reamer blade 72 meets the recessed surface defining the concave groove 82. Like the leading reamer blade 76, the trailing reamer blade 72 may also include a smaller diameter portion and a greater diameter portion. The smaller diameter portion is shown by ramp portion 73a in FIG. 2, and the larger diameter portion is shown by ramp portion 73b. In the disclosed embodiment, two land portions 52, 54 are provided, with one of the trailing reamer blades 72 formed at an end of land portion 52, and another of the trailing reamer blades 74 formed at an end of land portion 54. In this embodiment, the two trailing reamer blades 72, 74 are positioned 180° opposite each other.

With continued reference to FIG. 2, the spur 96 is provided on the end of the smaller diameter portion 92 of the leading reamer blade 76. The spur 96 projects outward on the boring end 14 of the shaft 12 past the tip 25 on the chip lifter 24. The leading reamer blade 76 also includes a chamfered portion 80 adjacent to the larger diameter portion 94. The chamfer portion 80 is formed between the cutting edge 77 and the groove 82 which separates the leading reamer blade 76 from the trailing reamer blade 72. As best seen in FIG. 5, on the opposite side of the leading reamer blade 76 from the groove 82 is yet another groove 86. The groove 86 is positioned between the leading reamer blade 76 and the peripheral chip lifter 24 of the tip portion 20. The cutting edge 77 defines an acute angle between the chamfered portion 80 at the outer surface of the reamer blade 76 and the inner surface that defines the groove 86.

Figure 4:
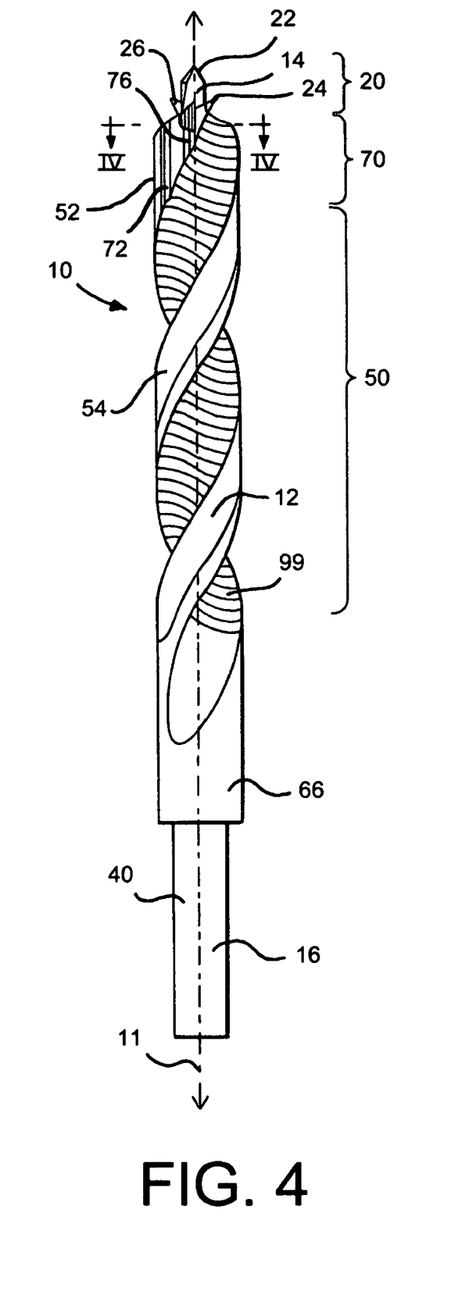
FIG. 4 shows another side view of the tool bit of FIG. 1 rotated ninety degrees from that of FIG. 3.

As best seen in FIGS. 4 and 5, reamer blades 72, 76 are provided on a single land portion 52 (or as an interrupted extension thereof). Likewise, reamer blades 74, 78 are provided on the other land portion 54 (or as an interrupted extension thereof). As best seen in FIG. 1, the cutting edges 73, 77 on the reamer blades 72, 76 are oriented in a substantially axial direction. Furthermore, leading reamer blade 76 includes a step up potion 90 where the diameter of the reamer blade increases from a first diameter to a second diameter. The trailing reamer blade may also be configured in a similar manner with such a step up portion.

In operation, the shank 40 of the tool bit 10 is positioned in the chuck of a drill or other tool. The tool causes the tool bit 10 to rotate about its axis. In order to drill a hole, the user touches the tip portion 20 of the tool bit 10 to a drilling surface, such as a piece of wood, at a desired location and forces the tool bit toward the drilling surface. The end tip 28 first contacts the drilling surface, creating a small hole which helps to stabilize the tool bit 10 in the desired place on the drilling surface. After the end tip 28 contacts the drilling surface, the spurs 96, 98 cut into the drilling surface, preparing the material for removal by the chip lifters 24, 26. Thereafter, the peripheral chip lifters 24, 26 of the tip arrangement contact the drilling surface, removing chips from the drilling surface and beginning a clean cut on the drilling surface. Chips of material removed by the chip lifters 24, 26 are channeled to the flutes 62, 64 toward the shank end 16 of the shaft 12. As the user continues to press the tool bit 10 toward the drilling surface, the tip portion 20 bores into the drilling surface, followed by the reamer portion 70 and the flute portion. The reamer blades 72, 74, along with the leading edges of the land portions 52, 54 work against the sidewalls of the hole created in the drilling surface to provide a smooth clean cut through the hole. The reamer blades 72, 74 also result in a hole of a precise size. Furthermore, because the reamer cutting blades include a smaller diameter portion near the tip, the reamer blades easily exit the hole, helping to maintain the clean smooth hole created by the user.

Although the present invention has been described with respect to certain preferred embodiments, it will be appreciated by those of skill in the art that other implementations and adaptations are possible. For example, although the disclosed embodiment of the tool bit is configured for use with wood, laminates, and related materials, the tool bit could be modified for use with metal or other materials. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A tool bit comprising:
a) an axial bit shaft including a bore end and a shank end;
b) at least one helical flute provided on the bit shaft adjacent to at least one helical land portion;
c at least one reamer blade provided on the bore end of the bit shaft, the at least one reamer blade including a cutting edge, wherein the reamer blade includes a step up portion provided between a smaller bit diameter portion and a larger bit diameter portion; and
d a tip arrangement included on the bore end of the bit shaft, the tip arrangement including a center tip,
wherein the tip arrangement includes a center blade positioned between at least two peripheral cutting blades, wherein the center tip is positioned on the center blade, and
wherein the at least two peripheral cutting blades are provided as spurs extending from the bore end of the axial shaft.

2. The tool bit of claim 1 wherein the at least one reamer blade is provided on the land portion at the bore end of the bit shaft.

3. The tool bit of claim 2 wherein the at least one reamer blade comprises a first reamer blade and a second reamer blade, wherein a groove is positioned between the first reamer blade and the second reamer blade.

4. The tool bit of claim 1 wherein the axial bit shaft comprises a tip portion, a reamer portion, and a flute portion, wherein the tip portion includes the tip arrangement, the reamer portion includes the at least one reamer blade, and the flute portion includes the at least one helical flute.

5. The tool bit of claim 1 wherein the step up portion includes a ramp portion where the diameter of the tool bit gradually increases between the smaller bit diameter portion and the larger bit diameter portion.

6. A tool bit comprising:
a) a bit shaft;
b) at least one helical land portion provided on the bit shaft;
c) at least one reamer blade provided on the bit shaft; and
d) a brad point arrangement included on an end of the bit shaft,
wherein the at least one reamer blade includes a substantially axial cutting edge.

7. The tool bit of claim 6 wherein the at least one reamer blade comprises a first reamer blade and a second reamer blade provided on the at least one helical land portion.

8. The tool bit of claim 7 wherein a groove is positioned between the first reamer blade and the second reamer blade on the helical land portion.

9. The tool bit of claim 6 wherein the brad point arrangement includes a center blade and at least two peripheral cutting blades on a bore end of the shaft, the center blade positioned between the at least two peripheral blades.

10. The tool bit of claim 6 wherein the axial bit shaft comprises a tip portion, a reamer portion, and a flute portion, wherein the tip portion includes the brad point arrangement, the reamer portion includes the at least one reamer blade, and the flute portion is void of any reamer cutting edges.

11. The tool bit of claim 6 wherein the at least one reamer blade includes a step up portion, the diameter of the reamer blade increasing from a smaller diameter to a larger diameter along the step up portion.

12. The tool bit of claim 11 wherein the step up portion includes a ramp such that the diameter of the tool bit gradually increases from the smaller diameter to the larger diameter along the ramp.

13. A tool bit comprising:
a) a bit shaft defining an axial direction, the bit shaft including a bore end and a shank end;
b) at least one helical flute provided on the bit shaft adjacent to at least one helical land portion;
c) a first substantially axial reamer blade provided on the bore end of the bit shaft;
d) a tip arrangement provided on the bore end of the bit shaft, the tip arrangement comprising a center blade positioned between at least two peripheral blades, the end point of the center blade defining the furthermost point on the bore end of the bit shaft from the shank end of the bit shaft; and
e) a second substantially axial reamer blade positioned on the bore end of the bit shaft between the first reamer blade and one of the peripheral blades of the tip arrangement.

14. The tool bit of claim 13 further comprising a groove provided on the bore end of the bit shaft between the first reamer blade and the second reamer blade.

15. The tool bit of claim 13 wherein the first substantially axial reamer blade and the second substantially axial reamer blade are provided on the at least one helical land portion.

16. The tool bit of claim 15 wherein the first substantially axial reamer blade includes a step up portion where the reamer blade increases from a first diameter to a second diameter.

* * * * *